(12) United States Patent
Kent et al.

(10) Patent No.: US 8,687,715 B2
(45) Date of Patent: *Apr. 1, 2014

(54) METHOD AND SYSTEM FOR RATE REDUCTION PRE-CODING MATRICES

(75) Inventors: Mark Kent, Vista, CA (US); Vinko Erceg, Cardiff, CA (US); Jun Zheng, San Diego, CA (US); Uri Landau, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1439 days.

This patent is subject to a terminal disclaimer.

(21) Appl. No.: 11/847,683

(22) Filed: Aug. 30, 2007

(65) Prior Publication Data

US 2008/0192853 A1 Aug. 14, 2008

Related U.S. Application Data

(60) Provisional application No. 60/889,406, filed on Feb. 12, 2007.

(51) Int. Cl.
*H04L 27/28* (2006.01)

(52) U.S. Cl.
USPC .......................................... 375/260; 375/296

(58) Field of Classification Search
USPC ............................ 375/144, 295, 296, 346, 347
See application file for complete search history.

(56) References Cited

U.S. PATENT DOCUMENTS

| 8,284,855 B2 * | 10/2012 | Khojastepour | 375/267 |
|---|---|---|---|
| 2006/0039489 A1 * | 2/2006 | Ikram et al. | 375/260 |
| 2006/0155533 A1 * | 7/2006 | Lin et al. | 704/223 |
| 2006/0270360 A1 * | 11/2006 | Han et al. | 455/69 |
| 2007/0098106 A1 * | 5/2007 | Khojastepour et al. | 375/267 |
| 2007/0174038 A1 * | 7/2007 | Wang et al. | 704/1 |
| 2007/0196072 A1 * | 8/2007 | Zhou et al. | 385/147 |
| 2008/0080459 A1 * | 4/2008 | Kotecha et al. | 370/342 |
| 2008/0080632 A1 * | 4/2008 | Kim et al. | 375/267 |

OTHER PUBLICATIONS

Chinese Patent Office first official action dated May 27, 2010.
European Search Report corresponding to European Patent Application Serial No. 07024544.4-1237, dated Apr. 8, 2009.
Li et al., "A Low Feedback Scheme for WMAN MIMO Beamforming." Radio and Wireless Symposium, IEEE 2007, pp. 349-352.

(Continued)

*Primary Examiner* — Shuwang Liu
*Assistant Examiner* — David Huang
(74) *Attorney, Agent, or Firm* — Sterne, Kessler, Goldstein & Fox PLLC

(57) ABSTRACT

Aspects of a method and system for a delta quantizer for rate reduction pre-coding matrices may include quantizing a change in channel state information in a MIMO pre-coding system onto a codebook and generating a pre-coding matrix based on at least the channel state information. The channel state information may be a matrix V and one or more associated singular values. The matrix V may be generated using Singular Value Decomposition (SVD) or Geometric Mean Decomposition (GMD). One or more columns of the matrix V may be selected based on the one or more associated singular values and may be combined to enable the generation of the pre-coding matrix. The codebook may comprise one or more unitary matrices. An index of an element of the codebook, onto which the change in channel state information is quantized, may be transmitted from a receiver to a transmitter.

20 Claims, 5 Drawing Sheets

(56) References Cited

OTHER PUBLICATIONS

"Codebook Design for E-UTRA MIMO." 3rd Generation Partnership Project, Mobile Competence Centre France, Jan. 10, 2007.

Zheng et al., "Efficient Closed-Loop Schemes for MIMO WLAN." Conference Record of the Thirty-Ninth IEEE Asilomar Conference on Signals, Oct. 28, 2005, pp. 1603-1607.
Communication pursuant to Article 94(3) EPC for European Patent Application No. 07024544.4-1237 dated Jul. 12, 2010.

* cited by examiner

METHOD AND SYSTEM FOR RATE REDUCTION PRE-CODING MATRICES

CROSS-REFERENCE TO RELATED APPLICATIONS/INCORPORATION BY REFERENCE

This application makes reference to, claims priority to, and claims the benefit of U.S. Provisional Application Ser. No. 60/889,406, filed on Feb. 12, 2007.

This application makes reference to:
U.S. Application Ser. No. 60/889,374, filed on Feb. 12, 2007;
U.S. Application Ser. No. 60/889,382, filed on Feb. 12, 2007;
U.S. Application Ser. No. 60/889,397, filed on Feb. 12, 2007;
U.S. application Ser. No. 11/847,628, filed on even date herewith;
U.S. application Ser. No. 11/847,647, filed on even date herewith; and
U.S. application Ser. No. 11/847,669, filed on even date herewith;

Each of the above referenced applications is hereby incorporated herein by reference in its entirety.

FIELD OF THE INVENTION

Certain embodiments of the invention relate to signal processing for communication systems. More specifically, certain embodiments of the invention relate to a method and system for rate reduction pre-coding matrices.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power and bandwidth, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some work on multiple antenna systems may be focused on systems that support single user point-to-point links, other work may focus on multiuser scenarios. Communication systems that employ multiple antennas may greatly improve the system capacity.

To obtain significant performance gains using MIMO technology, it may however be desirable to supply information on the channel to the transmitter to allow, for example, MIMO pre-coding. MIMO pre-coding and other MIMO technologies based at the MIMO transmitter may benefit or require knowledge about the channel, referred to as channel state information (CSI). Furthermore, because many wireless systems operate in frequency division duplex (FDD) mode, the uplink and downlink connections may use different frequencies. In these instances, channel measurements may only be made available at the transmitter by measuring the channel at the receiver and feeding back the information. However, with increasing numbers of transmit and receive antennas in the MIMO system, feeding back channel state information may involve transferring large amounts of data. Additionally, it may be desirable in some instances to deliberately limit data rates in order to improve transmission range of the communication system.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for rate reduction pre-coding matrices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for rate reduction pre-coding matrices. Aspects of the method and system for a rate reduction pre-coding matrices may comprise quantizing a change in channel state information in a MIMO pre-coding system onto a codebook and generating a pre-coding matrix based on at least the channel state information. The channel state information may be a matrix V and one or more associated singular values. The matrix V may be generated using Singular Value Decomposition (SVD) or Geometric Mean Decomposition (GMD). One or more columns of the matrix V may be selected based on the one or more associated singular values and may be combined to enable the generation of the pre-coding matrix. The codebook may comprise one or more unitary matrices. An index of an element of the codebook, onto which the change in channel state information is quantized, may be transmitted from a receiver to a transmitter in the MIMO pre-coding system. A communication system comprising the MIMO pre-coding system may comprise one or more transmit antennas and one or more receive antennas. A matrix may be linearly transformed with the pre-coding matrix at a transmitter of the MIMO pre-coding system.

Figure 1A:
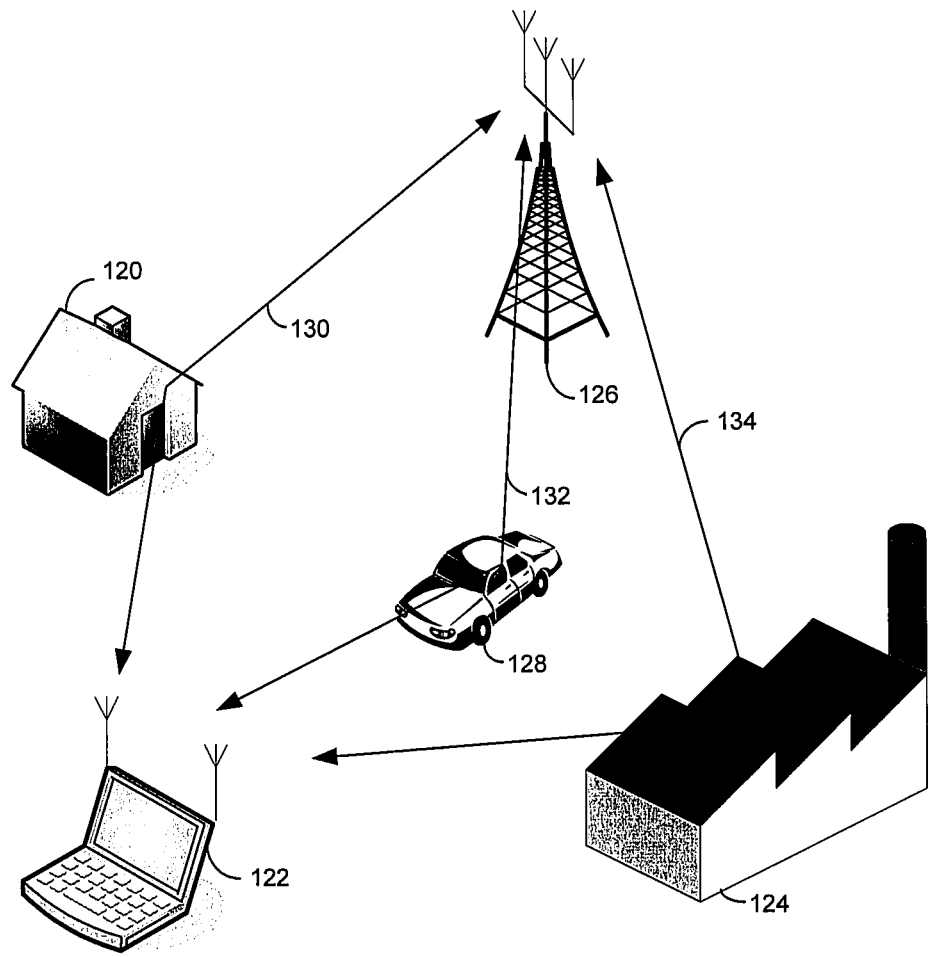
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a house 120, a mobile terminal 122, a factory 124, a base station 126, a car 128, and communication paths 130, 132 and 134.

The base station 126 and the mobile terminal 122 may comprise suitable logic, circuitry and/or code that may be enabled to generate and process MIMO communication signals. Wireless communications between the base station 126 and the mobile terminal 122 may take place over a wireless channel. The wireless channel may comprise a plurality of communication paths, for example, the communication paths 130, 132 and 134. The wireless channel may change dynamically as the mobile terminal 122 and/or the car 128 moves. In some cases, the mobile terminal 122 may be in line-of-sight (LOS) of the base station 126. In other instances, there may not be a direct line-of-sight between the mobile terminal 122 and the base station 126 and the radio signals may travel as reflected communication paths between the communicating entities, as illustrated by the exemplary communication paths 130, 132 and 134. The radio signals may be reflected by man-made structures like the house 120, the factory 124 or the car 128, or by natural obstacles like hills. Such a system may be referred to as a non-line-of-sight (NLOS) communications system.

A communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 122. The communication paths 130, 132 and 134 may also be differently attenuated. In the downlink, for example, the received signal at the mobile terminal 122 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 122, in particular for NLOS communication systems.

Figure 1B:
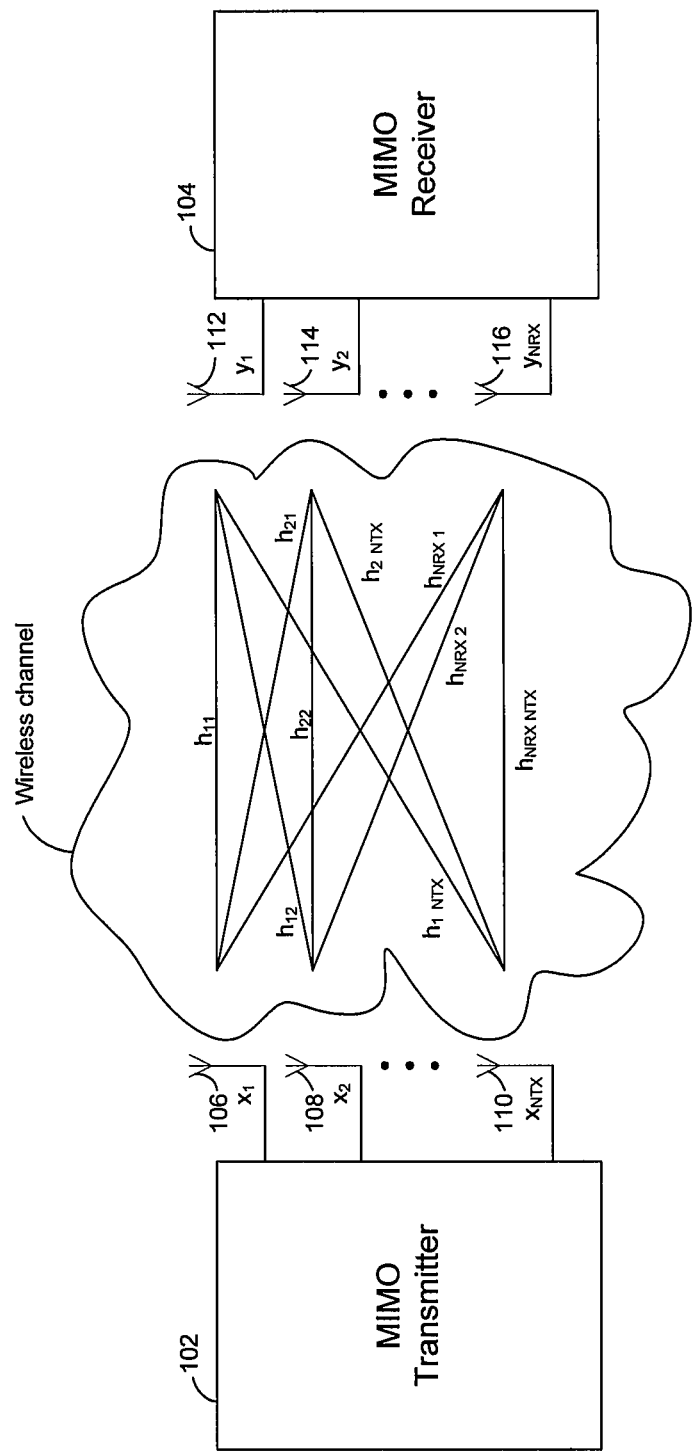
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. There is also shown a wireless channel comprising communication paths $h_{11}$, $h_{12}$, $h_{22}$, $h_{21}$, $h_{2\;NTX}$, $h_{1\;NTX}$, $h_{NRX\;1}$, $h_{NRX\;2}$, $h_{NRX\;NTX}$, where $h_{mn}$ may represent a channel coefficient from transmit antenna n to receiver antenna m. There may be $N_{TX}$ transmitter antennas and $N_{Rx}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry and/or code that may be enabled to generate transmit symbols $x_i$ $i \in \{1,2, \ldots N_{TX}\}$ that may be transmitted by the transmit antennas, of which the antennas 106, 108 and 110 may be depicted in FIG. 1B. The MIMO receiver 104 may comprise suitable logic, circuitry and/or code that may be enabled to process the receive symbols $y_i$ $i \in \{1,2, \ldots N_{RX}\}$ that may be received by the receive antennas, of which the antennas 112, 114 and 116 may be shown in FIG. 1B. An input-output relationship between the transmitted and the received signal in a MIMO system may be written as:

$$y = Hx + n$$

where $y=[y_1, y_2, \ldots y_{NRX}]^T$ may be a column vector with $N_{RX}$ elements, $.^T$ may denote a vector transpose, $H=[h_{ij}]$: $i \in \{1,2, \ldots N_{RX}\}$; $j \in \{1,2, \ldots N_{TX}\}$ may be a channel matrix of dimensions $N_{RX}$ by $N_{TX}$, $x=[x_1, x_2, \ldots x_{NTX}]^T$ is a column vector with $N_{TX}$ elements and n is a column vector of noise samples with $N_{RX}$ elements. The channel matrix H may be written, for example, as $H=U\Sigma V^H$ using the Singular Value Decomposition (SVD), where $.^H$ denotes the Hermitian transpose, U is a $N_{RX}$ by $N_{TX}$ unitary matrix, $\Sigma$ is a $N_{TX}$ by $N_{TX}$ diagonal matrix and V is $N_{TX}$ by $N_{TX}$ unitary matrix. Other matrix decompositions that may diagonalize or transform the matrix H may be used instead of the SVD. If the receiver algorithm implemented in MIMO receiver 104 is, for example, an Ordered Successive Interference Cancellation (OSIC), other matrix decompositions that convert the matrix H to lower/upper triangular may be appropriate. One such decomposition may comprise Geometric Mean Decomposition (GMD), where $H=QRP^H$, where R may be upper triangular with the geometric mean of the singular values of H on the diagonal elements, and Q and P may be unitary.

Figure 2:
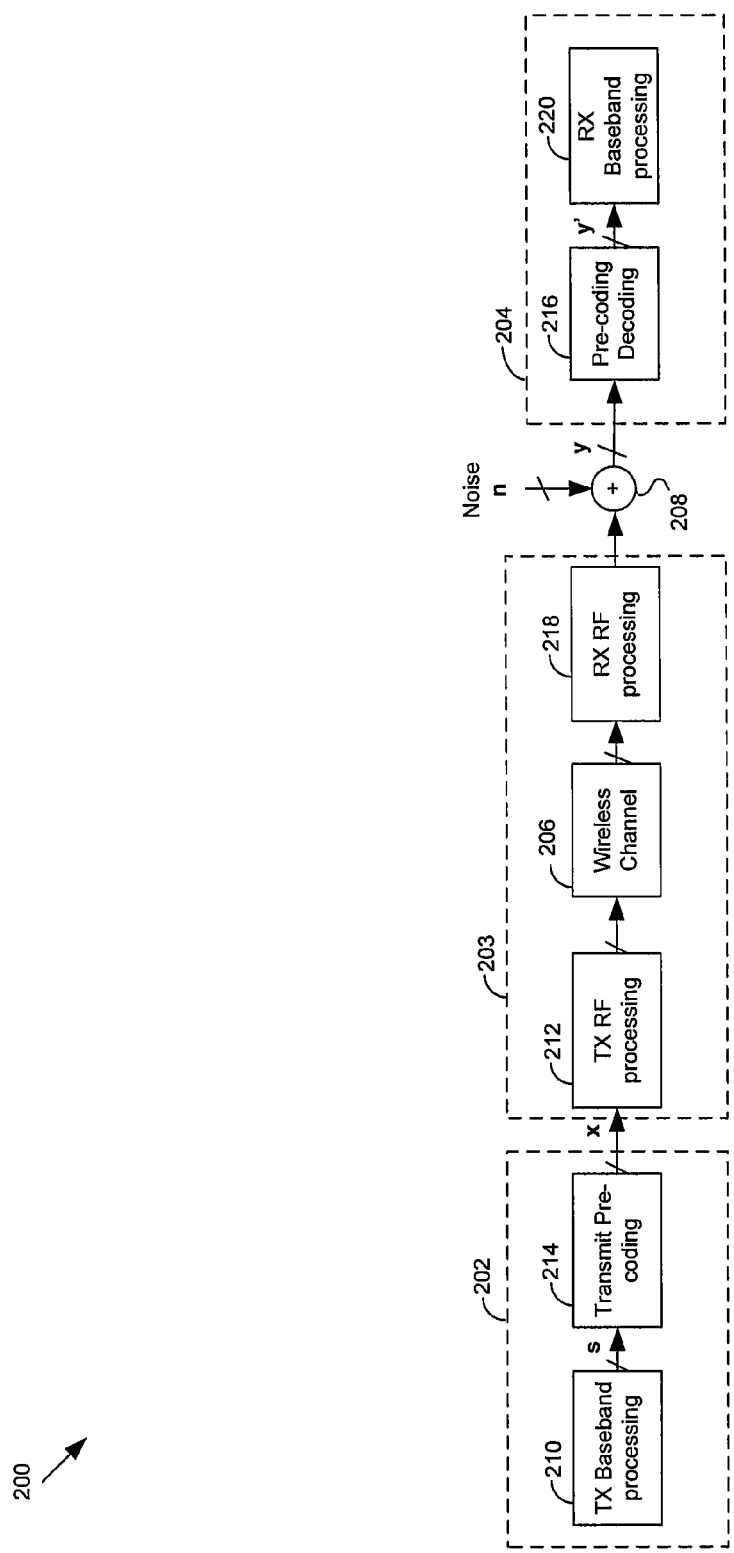
FIG. 2 is a block diagram illustrating an exemplary MIMO pre-coding transceiver chain model, in accordance with an embodiment of the invention.

FIG. 2 is a block diagram illustrating an exemplary MIMO pre-coding transceiver chain model, in accordance with an embodiment of the invention. Referring to FIG. 2, there is shown a MIMO pre-coding system 200 comprising a MIMO transmitter 202, a MIMO baseband equivalent channel 203, a MIMO receiver 204, and an adder 208. The MIMO transmitter 202 may comprise a transmitter (TX) baseband processing block 210 and a transmit pre-coding block 214. The MIMO baseband equivalent channel 203 may comprise a wireless channel 206, a TX radio frequency (RF) processing block 212 and a receiver (RX) RF processing block 218. The MIMO receiver 204 may comprise a pre-coding decoding block 216 and a RX baseband processing block 220. There is also shown symbol vector s, pre-coded vector x, noise vector n, received vector y and channel-decoded vector y'.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214. A baseband signal may be suitably coded for transmission over a wireless channel 206 in the transmit pre-coding block 214 that may comprise suitable logic, circuitry and/or code that may enable it to perform these functions. The TX RF processing block 212 may comprise suitable logic, circuitry and/or code that may enable a signal communicated to the TX RF processing block 212 to be modulated to radio frequency (RF) for transmission over the wireless channel 206. The RX RF processing block 218 may comprise suitable logic, circuitry and/or code that may be enabled to perform radio frequency front-end functionality to receive the signal transmitted over the wireless channel 206. The RX RF processing block 218 may comprise suitable logic, circuitry and/or code that may enable the demodulation of its input signals to baseband. The adder 208 may depict the addition of noise to the received signal at the MIMO receiver 204. The MIMO receiver 204 may comprise the pre-coding decoding block 216 that may linearly decode a received signal and communicate it to the RX baseband processing block 220. The RX baseband processing block 220 may comprise suitable logic, circuitry and/or logic that may enable to apply further signal processing to baseband signal.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214 and may be the symbol vector s. The symbol vector s may be of dimension $N_{TX}$ by 1.

The transmit pre-coding block 214 may be enabled to apply a linear transformation to the symbol vector s, so that x=Ws, where W may be of dimension $N_{TX}$ by length of s, and $x=[x_1, x_2, \ldots x_{NTX}]^T$. Each element of the pre-coded vector x may be transmitted on a different antenna among $N_{TX}$ available antennas.

The transmitted pre-coded vector x may traverse the MIMO baseband equivalent channel 203. From the $N_{RX}$ receiver antennas, the received signal y may be the signal x transformed by the MIMO baseband equivalent channel 203 represented by a matrix H, plus a noise component given by the noise vector n. As depicted by the adder 208, the received vector y may be given by y=Hx+n=HWs+n. The received vector y may be communicated to the pre-coding decoding block 216, where a linear decoding operation B may be applied to the received vector y to obtain the decoded vector $y'=B^H y=B^H HWs+B^H n$, where B may be a complex matrix of appropriate dimensions. The decoded vector y' may then be communicated to the RX baseband processing block 220 where further signal processing may be applied to the output of the pre-coding decoding block 216.

If the transfer function H of the MIMO baseband equivalent channel 203 that may be applied to the transmitted pre-coded vector x is known both at the MIMO transmitter 202 and the MIMO receiver 204, the channel may be diagonalized by, for example, setting W=V and B=U, where $H=U\Sigma V^H$ may be the singular value decomposition. In these instances, the channel decoded vector y' may be given by the following relationship:

$$y'=U^H U\Sigma V^H Vs+U^H n=\Sigma s+U^H n$$

Since $\Sigma$ may be a diagonal matrix, there may be no interference between the elements of symbol vector s in y' and hence the wireless communications system may appear like a system with up to $N_{TX}$ parallel single antenna wireless communication systems, for each element of s, up to the rank of channel matrix H which may be less or equal to $N_{TX}$.

Figure 3:
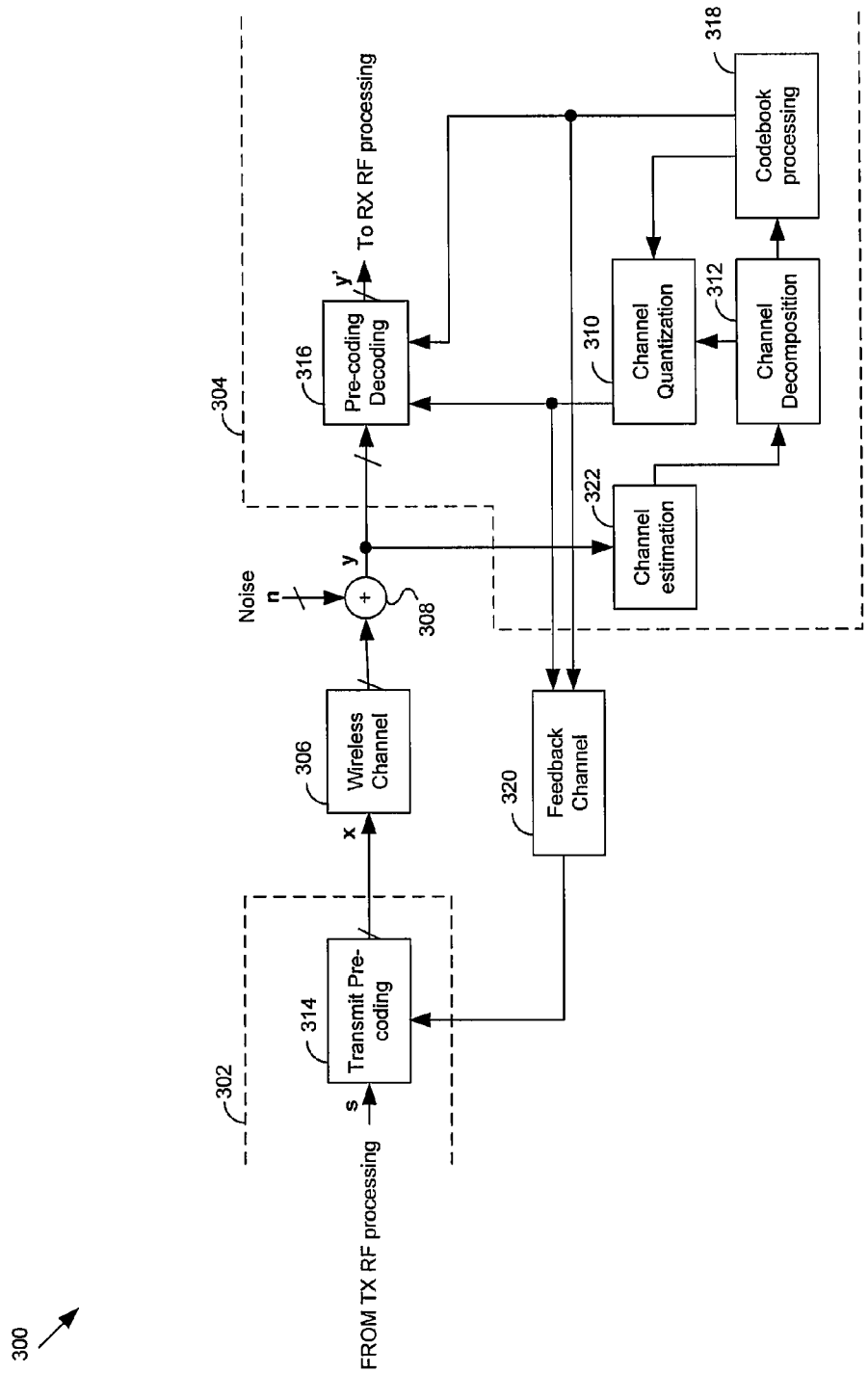
FIG. 3 is a block diagram of an exemplary MIMO pre-coding system with finite rate channel state information feedback, in accordance with an embodiment of the invention.

FIG. 3 is a block diagram of an exemplary MIMO pre-coding system with finite rate channel state information feedback, in accordance with an embodiment of the invention. Referring to FIG. 3, there is shown a MIMO pre-coding system 300 comprising a partial MIMO transmitter 302, a partial MIMO receiver 304, a Wireless channel 306, an adder 308, and a feedback channel 320. The partial MIMO transmitter 302 may comprise a transmit pre-coding block 314. The partial MIMO receiver 304 may comprise a pre-coding decoding block 316, a channel estimation block 322, a channel quantization block 310, a channel decomposition block 312, and a codebook processing block 318. There is also shown a symbol vector s, a pre-coded vector x, a noise vector n, a received vector y, and a decoded vector y'.

The transmit pre-coding block 314, the wireless channel 306, the adder 308 and the pre-coding decoding block 316 may be substantially similar to the transmit pre-coding block 214, the MIMO baseband equivalent channel 203, the adder 208 and the pre-coding decoding block 216, illustrated in FIG. 2. The channel estimation block 322 may comprise suitable logic, circuitry and/or logic to estimate the transfer function of the wireless channel 206. The channel estimate may be communicated to the channel decomposition block 312 that may be enabled by suitable logic, circuitry and/or code, to decompose the channel. In this respect, the decomposed channel may be communicated to the channel quantization block 310. The channel quantization block 310 may comprise suitable logic, circuitry and/or logic to partly quantize the channel onto a codebook. The codebook processing block 318 may comprise suitable logic, circuitry and/or logic that may be enabled to generate a codebook. The feedback channel 320 may represent a channel that may be enabled to carry channel state information from the partial MIMO receiver 304 to the partial MIMO transmitter 302.

In many wireless systems, the channel state information, that is, knowledge of the channel transfer matrix H, may not be available at the transmitter and the receiver. However, in order to utilize a pre-coding system as illustrated in FIG. 2, it may be desirable to have at least partial channel knowledge available at the transmitter. In the exemplary embodiment of the invention disclosed in FIG. 2, the MIMO transmitter 302 may require the unitary matrix V for pre-coding in the transmit pre-coding block 214 of MIMO transmitter 202.

In frequency division duplex (FDD) systems, the frequency band for communications from the base station to the mobile terminal, downlink communications, may be different from the frequency band in the reverse direction, uplink communications. Because of a difference in frequency bands, a channel measurement in the uplink may not generally be useful for the downlink and vice versa. In these instances, the measurements may only be made at the receiver and channel state information (CSI) may be communicated back to the transmitter via feedback. For this reason, the CSI may be fed back to the transmit pre-coding block 314 of the partial MIMO transmitter 302 from the partial MIMO receiver 304 via the feedback channel 320. The transmit pre-coding block 314, the wireless channel 306, and the adder 308 are substantially similar to the corresponding blocks 214, 203 and 208, illustrated in FIG. 2.

At the partial MIMO receiver 304, the received signal y may be used to estimate the channel transfer function H by $\hat{H}$ in the channel estimation block 322. The estimate may further be decomposed into, for example, a diagonal or triangular form, depending on a particular receiver implementation, as explained for FIG. 2. For example, the channel decomposition block 312 may perform an SVD: $\hat{H} = \hat{U}\hat{\Sigma}\hat{V}^H$. The matrix H and $\hat{H}$ may be rank $1 \leq r \leq N_{TX}$ matrices. In the case of a plurality of antennas, the dimensions of the matrices U, $\Sigma$ and V may grow quickly. In these instances, it may be desirable to quantize the matrix $\hat{V}$ into a matrix $V_k$ of dimensions $N_{TX}$ by $N_{TX}$, where $V_k = V_{k-1} \cdot Q_q^0$ may be generated from the last $V_k$, that is $V_{k-1}$, and a unitary rotation matrix $Q_q^0$ from a pre-defined finite set of unitary matrices $C_d = \{Q_i\}$. The set of unitary matrices $C_d$ may be referred to as the codebook. The matrix $\hat{V}$ may change relatively slowly with respect to the channel update rate. In these instances, it may be more economical to send an update to the previous quantized matrix $V_{k-1}$ instead of a new matrix $V_k$ and utilize channel memory. By finding a matrix $Q_q^0$ from the codebook $C_d$ that may generate a $V_k$ that may be, in some sense, closest to the matrix $\hat{V}$, it may suffice to transmit the index q of the matrix $Q_q^0$ to the transmit pre-coding block 314. This may be achieved via the feedback channel 320 from the channel quantization block 310. The partial MIMO transmitter 302 may need to know the codebook $C_d$. The codebook $C_d$ may be varying much slower than the channel transfer function H and it may suffice to periodically update the codebook $C_d$ in the transmit pre-coding block 314 from the codebook processing block 318 via the feedback channel 320. The codebook $C_d$ may be chosen to be static or adaptive. Furthermore, the codebook $C_d$ may also be chosen, adaptively or non-adaptively, from a set of codebooks, which may comprise adaptively and/or statically designed codebooks. In these instances, the partial MIMO receiver 304 may inform the partial MIMO transmitter 302 of the codebook in use at any given instant in time. The matrix $\hat{V}$ may be quantized, for example, into $V_k$ as described by the following relationships:

$$Q_q^0 = \arg\max_{\hat{Q}_q \in C_d} f(\hat{V}^H V_{k-1} \hat{Q}_q) \qquad (1)$$

$$f(A) = \left(\frac{1}{N}\sum_{j=1}^{N} |a_{jj}|^2\right)$$

where $A = [a_{ij}]$ and A may be of dimensions N by N. Hence, the matrix $Q_q^0$ may be chosen as the matrix $\hat{Q}_q$ in the codebook $C_d$ that may maximize the function $f(\hat{V}^H V_{k-1} \hat{Q}_q)$ as defined above. The exemplary function f(.) may average the squared absolute value of the diagonal elements of its input matrix. By maximizing f(.), the matrix $V_k$ may be chosen so that the product $\hat{V}^H V_k$ may be most like an identity matrix, in some sense. The expression for f(.) above may maximize the instantaneous capacity of the pre-coded MIMO system under some approximations. In another embodiment of the invention, the function f(.) may be defined differently from equation (1). Hence, the channel H may be estimated in the channel estimation block 322 and decomposed in the channel decomposition block 312.

In the channel quantization block 310, a matrix, for example $\hat{V}$ may be quantized into a matrix $V_k = V_{k-1} \cdot Q_q^0$ and the index q may be fed back to the partial MIMO transmitter 302 via the feedback channel 320. Less frequently than the index q, the codebook $C_d$ from the codebook processing block 318 may be transmitted to the partial MIMO transmitter 302 via the feedback channel 320. The codebook $C_d$ may also be chosen time invariant. Furthermore, the codebook $C_d$ may also be chosen, adaptively or non-adaptively, from a set of codebooks, which may comprise adaptively and/or statically designed codebooks. To feedback the index q, M bits may suffice when the cardinality |C| of the codebook C may be less or equal to $|C| \leq 2^M$.

A MIMO pre-coding system 300 may enable transmission of $r \leq N_{TX}$ parallel data streams, as described with regard to FIG. 2. For example, in a 4×4 MIMO system, up to four parallel data streams may be used in some instances. However, each data stream may require a certain transmission power to enable reception at the MIMO receiver with a sufficiently large Signal-to-Noise ratio (SNR) so that the desired performance may be obtained. In some instances, other performance measures may be used instead of the SNR. The required transmission power to obtain a desired data rate and/or other performance measure at the partial MIMO transmitter 302 may increase with increasing separation distance between the partial MIMO transmitter 302 and the partial MIMO transmitter 304. In some instances, the available transmission power at the partial MIMO transmitter 302 may be limited. In these instances, transmission range may be increased by distributing the available power on fewer parallel data streams. In this manner, the available power may be concentrated on fewer data streams, whereby the range of these streams may be increased. However, since the remaining data streams may be non-powered due to, for example, insufficient available transmission power, the overall data rate in the MIMO system 300 may be reduced. Hence, a trade-off between data rate and transmission range may be possible.

As explained for FIG. 2, the channel matrix may be decomposed, for example, by using the Singular Value Decomposition (SVD): $\hat{H} = \hat{U}\hat{\Sigma}\hat{V}^H$. The diagonal matrix $\hat{\Sigma}$. may comprise the singular values of the matrix $\hat{H}$. The capacity and SNR of a data stream in a MIMO pre-coding system 300 may be related to the absolute value of the singular values comprised in $\hat{\Sigma}$, that is, the most efficient data streams with the best capacity may be those associated with the largest singular values. Associated with each singular value in $\hat{\Sigma}$ may be a column vector in $\hat{U}$ and in $\hat{V}$. By writing the matrices $\hat{U}$ and $\hat{V}$ in terms of column vectors, that is, $\hat{U}=[u_1, u_2, \ldots, u_{NTX}]$ and $\hat{V}=[v_1, v_2, \ldots, v_{NTX}]$, the singular value decomposition may be expressed as $$\hat{H} = \hat{U}\hat{\Sigma}\hat{V}^H = \sum_{i=1}^{N_{TX}} \sigma_i u_i v_i^H,$$

where $\sigma_i$ may be the i-th singular values from $\hat{\Sigma}$. Furthermore, without loss of generality, it may be assumed that the singular values may be ordered, so that $\sigma_1 \geq \sigma_2 \geq \ldots \geq \sigma_{NTX}$. As explained above, the streams that may be efficient to use may be those associated with large singular values. This may be achieved in a MIMO pre-coding system 300 by constructing a matrix $V_k'$, which may comprise some of the column of $V_k$ associated with large singular values. For example, for $L \leq N_{TX}$ utilized data streams a pre-coding matrix $V_k' = [v_1, v_2, \ldots, v_L]$ may be obtained. Correspondingly, the data column vector s may comprise L elements. In these instances, the partial MIMO transmitter 302 may communicate with the transmit pre-coding block 314 to determine how many columns of $V_k$ may be required to construct the pre-coding matrix $V_k'$. The number of transmitted data streams may be equal to the number of columns used in $V_k'$. Usage of a pre-coding matrix $V_k'$ with $L \leq N_{TX}$ columns may be referred to as reduced-rank MIMO pre-coding.

The transmit pre-coding block 314 may perform, for example, the linear transformation $x = V_k's$. The pre-coding decoding block 316 at the receiver may implement the linear transformation $y' = \hat{U}^H y$.

A codebook $C_d$ may comprise complex unitary matrices $\{Q_q\}$. A desirable codebook may be one that comprises an easily adjustable dynamic range. This may be interpreted for rotation matrices $\{Q_q\}$ to mean that the absolute range of angles over which the set $C_d$ may rotate may be adaptable or configurable, as may the granularity, that is the step size between neighboring matrices $Q_q$. Adaptability of the dynamic range may allow the codebook to be adapted to a wide variety of different channel conditions. In particular, the codebook $C_d$ may be adapted to the rate of change of the wireless channel matrix H.

Figure 4:
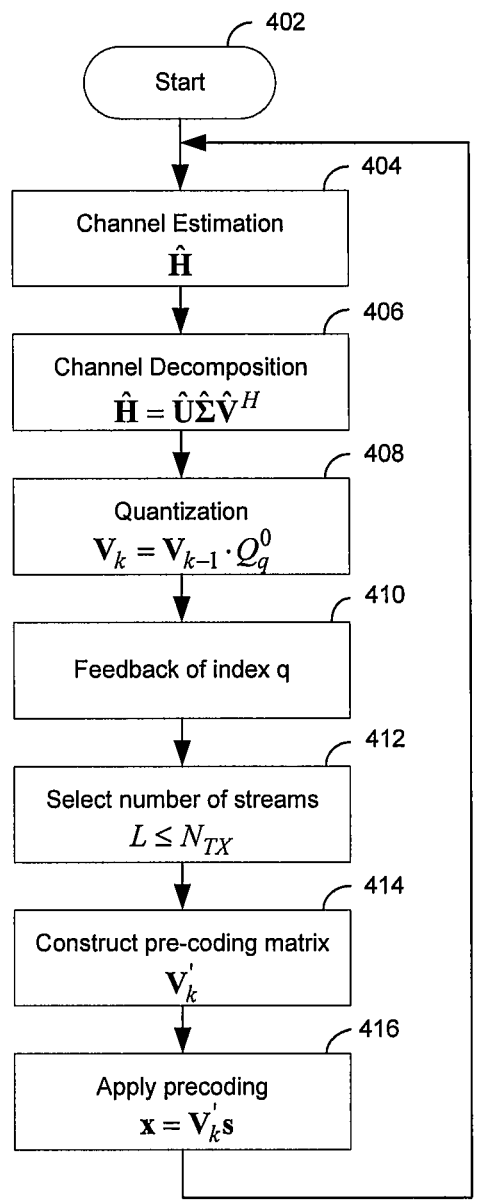
FIG. 4 is a flow chart illustrating an exemplary MIMO pre-coding process, in accordance with an embodiment of the invention.

FIG. 4 is a flow chart illustrating an exemplary MIMO pre-coding process, in accordance with an embodiment of the invention. Referring to FIG. 4, there is shown steps 402 through 416.

A MIMO pre-coding process may be initialized in step 402. In step 404, a channel estimate of the transmission channel between the MIMO transmitter and the MIMO receiver may be obtained. This step may correspond to obtaining the transfer function $\hat{H}$ of the wireless channel 306 in a MIMO pre-coding system 300, as illustrated in FIG. 3. The channel transfer function in the form of the matrix $\hat{H}$ may then be decomposed, for example, by using singular value decomposition (SVD) and/or geometric mean decomposition (GMD), in step 406. This operation may, for instance, be performed in the channel decomposition block 312 in FIG. 3. The change in the channel may be quantized onto a codebook to obtain $Q_q^0$ in step 408. In step 410, the index q of the element $Q_q^0 \in C_d$ may be fed back from the partial MIMO receiver 304 to the partial MIMO transmitter 302 via the feedback channel 320, as illustrated in FIG. 3. At the MIMO transmitter, for example partial MIMO transmitter 302, the number of data streams $L \leq N_{TX}$ may be determined in step 412, based on information that may be received from the receiver via feedback, for example. Based on the number of streams L, the pre-coding matrix $V_k'$ may be constructed from $V_k$ in step 414. In step 416, the pre-coding matrix $V_k'$ may be applied to a data symbol vector s of appropriate dimensions. In another embodiment of the invention, the number of streams L that may be utilized may be determined less frequently. For example, the number of streams L to be utilized may be determined and/or updated in step 412 every $N_L$ loops, as illustrated in FIG. 4, and remain, for example, constant between successive updated values.

In accordance with an embodiment of the invention, a method and system for rate reduction pre-coding matrices may comprise quantizing a change in channel state information in a MIMO pre-coding system 300 onto a codebook and generating a pre-coding matrix based on at least the channel state information, as described with regards to FIG. 3 and FIG. 4. The channel state information may be a matrix V and one or more associated singular values. The matrix V may be generated using Singular Value Decomposition (SVD) or Geometric Mean Decomposition (GMD) in the channel decomposition block 312. One or more columns of the matrix V may be selected, at the partial MIMO transmitter 302, based on the associated singular values and may be combined to enable the generation of the pre-coding matrix in the transmit pre-coding block 314. The codebook may comprise one or more unitary matrices. An index of an element of the codebook, onto which the change in channel state information is quantized, may be transmitted from the partial MIMO receiver 304 to the partial MIMO transmitter 302 via the feedback channel 320 in the MIMO pre-coding system 300. A communication system comprising the MIMO pre-coding system 300 may comprise one or more transmit antennas and one or more receive antennas. A matrix may be linearly transformed with the pre-coding matrix at the partial MIMO transmitter 302 of the MIMO pre-coding system 300 in the transmit pre-coding block 314.

Another embodiment of the invention may provide a machine-readable storage, having stored thereon, a computer program having at least one code section executable by a machine, thereby causing the machine to perform the steps as described above for a method and system for rate reduction pre-coding matrices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   quantizing current channel state information in a multiple-input and multiple-output (MIMO) pre-coding system onto a codebook, wherein said quantized current channel state information is generated based on previous quantized channel state information and based on a unitary rotation matrix from said codebook;
   determining a number of data streams based on the current channel state information; and
   generating a pre-coding matrix based on at least said current channel state information and the determined number of data streams.

2. The method according to claim 1, wherein said channel state information is a matrix V and one or more associated singular values.

3. The method according to claim 2, comprising generating said matrix V using Singular Value Decomposition (SVD) or Geometric Mean Decomposition (GMD).

4. The method according to claim 2, comprising selecting one or more columns of said matrix V based on said one or more associated singular values.

5. The method according to claim 4, comprising combining said selected one or more columns for said generation of said pre-coding matrix.

6. The method according to claim 1, wherein said codebook comprises one or more unitary matrices.

7. The method according to claim 1, comprising transmitting an index of an element of said codebook, onto which said current channel state information is quantized, from a receiver to a transmitter in said MIMO pre-coding system.

8. The method according to claim 1, wherein a communication system comprising said MIMO pre-coding system comprises one or more transmit antennas and one or more receive antennas.

9. The method according to claim 1, comprising linearly transforming with said pre-coding matrix, a matrix at a transmitter of said MIMO pre-coding system.

10. A system for processing communication signals, the system comprising:
    one or more circuits in a multiple-input and multiple-output MIMO pre-coding system, said one or more circuits configured to:
    quantize current channel state information in a MIMO pre-coding system onto a codebook, wherein said quantized current channel state information is generated based on previous quantized channel state information and based on a unitary rotation matrix from said codebook;
    determine a number of data streams based on the current channel state information; and
    generate a pre-coding matrix based on at least said current channel state information and the determined number of data streams.

11. The system according to claim 10, wherein said channel state information is a matrix V and one or more associated singular values.

12. The system according to claim 11, wherein said one or more circuits are further configured to:
    generate said matrix V using Singular Value Decomposition (SVD) or Geometric Mean Decomposition (GMD).

13. The system according to claim 11, wherein said one or more circuits are further configured to:
    select one or more columns of said matrix V based on said one or more associated singular values.

14. The system according to claim 13, wherein said one or more circuits are further configured to:
    combine said selected one or more columns for said generation of said pre-coding matrix.

15. The system according to claim 10, wherein said codebook comprises one or more unitary matrices.

16. The system according to claim 10, wherein said one or more circuits are further configured to:
    transmit an index of an element of said codebook, onto which said current channel state information is quantized, from a receiver to a transmitter in said MIMO pre-coding system.

17. The system according to claim 10, wherein a communication system comprising said MIMO pre-coding system comprises one or more transmit antennas and one or more receive antennas.

18. The system according to claim 10, wherein said one or more circuits are further configured:
    linearly transform, with said pre-coding matrix, a matrix at a transmitter of said MIMO pre-coding system.

19. A method for multiple-input and multiple-output (MIMO) pre-coding, comprising:
    obtaining a transfer function for a transmission channel between a MIMO transmitter and a MIMO receiver;
    decomposing the transfer function;
    quantizing, based on the decomposed transfer function, a change in the channel onto a codebook;
    determining a number of data streams based on the change in the channel;
    constructing a pre-coding matrix based on the number of streams; and
    applying the pre-coding matrix to a data symbol vector.

20. The method of claim 19, further comprising:
    feeding back, from the MIMO receiver to the MIMO transmitter, an index of the element in the codebook corresponding to the change in the channel via a feedback channel.

* * * * *

UNITED STATES PATENT AND TRADEMARK OFFICE
CERTIFICATE OF CORRECTION

| | | |
|---|---|---|
| PATENT NO. | : 8,687,715 B2 | Page 1 of 1 |
| APPLICATION NO. | : 11/847683 | |
| DATED | : April 1, 2014 | |
| INVENTOR(S) | : Kent et al. | |

It is certified that error appears in the above-identified patent and that said Letters Patent is hereby corrected as shown below:

In the Claims

Column 11, line 54, please replace "MIMO" with --(MIMO)--.

Column 12, line 37, please replace "further configured:" with --further configured to:--.

Signed and Sealed this
Fourteenth Day of April, 2015

Michelle K. Lee
*Director of the United States Patent and Trademark Office*